Jan. 27, 1925.  1,524,321

F. A. STEVENS ET AL

SPECTACLE TEMPLE

Filed June 14, 1923

Inventors:-
Frederick A. Stevens
James W. Welsh.
by David Rines
Attorney:-

Patented Jan. 27, 1925.

1,524,321

UNITED STATES PATENT OFFICE.

FREDERICK A. STEVENS AND JAMES W. WELSH, OF PROVIDENCE, RHODE ISLAND, ASSIGNORS, BY MESNE ASSIGNMENTS, TO BAUSCH AND LOMB OPTICAL COMPANY, OF ROCHESTER, NEW YORK, A CORPORATION OF NEW YORK.

SPECTACLE TEMPLE.

Application filed June 14, 1923. Serial No. 645,260.

*To all whom it may concern:*

Be it known that we, FREDERICK A. STEVENS and JAMES W. WELSH, citizens of the United States, and residents of Providence, in the county of Providence and State of Rhode Island, have jointly invented a new and useful Improvement in Spectacle Temples, of which the following is a specification.

The present invention relates to spectacle temples, and more particularly to temples of the non-metallic type.

Spectacle temples are adapted to be hinged to the lens-carrying frame at their forward ends, and to engage the skull or behind the ear at their rear ends. The rear ends should therefore be flexible, else they would bind uncomfortably against some portion of the wearer's head. They should not, on the other hand, be too flexible, because they could not then perform their required function of holding the lens-carrying frame in place. The well known, metal, cable temple serves the purpose well. If the lens-carrying frame is constituted of zylonite or other non-metallic material, however, it is not practicable to employ a metal temple; and temples constituted of non-metallic material have generally been stiff and unyielding, often causing the wearer much discomfort.

It is therefore an object of the present invention to provide a spectacle temple having the appearance of zylonite or other non-metallic material, the rear portions of which shall be flexible. Other objects will appear hereinafter.

With these ends in view, a feature of the invention resides in covering a flexible reinforcing rod with a fabric, and enclosing the fabric in a flexible non-metallic tube.

With the above objects in view, the invention consists of the improved spectacle temple hereinafter described, illustrated in the accompanying drawings and defined in the appended claims.

Figure 1:
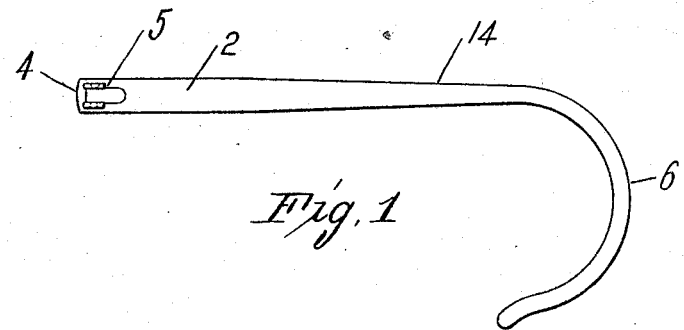
Figure 2:
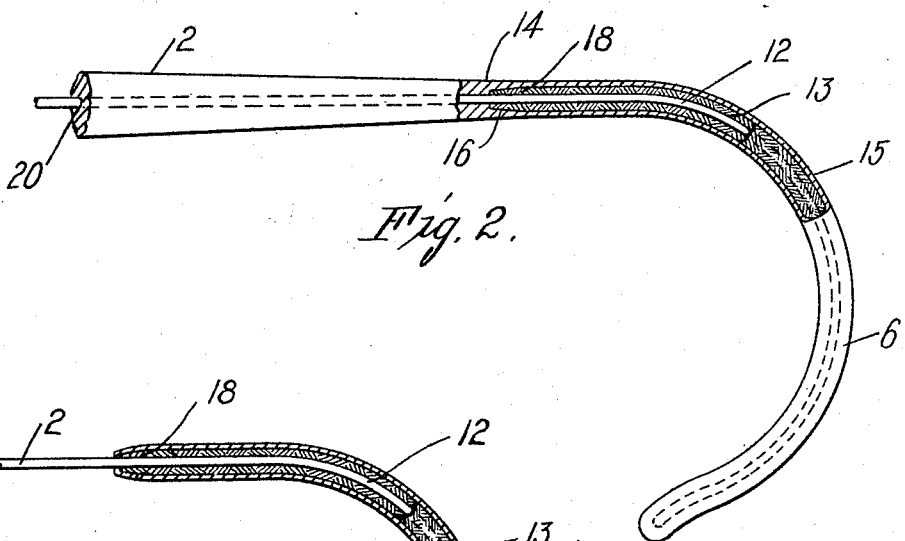
Figure 3:
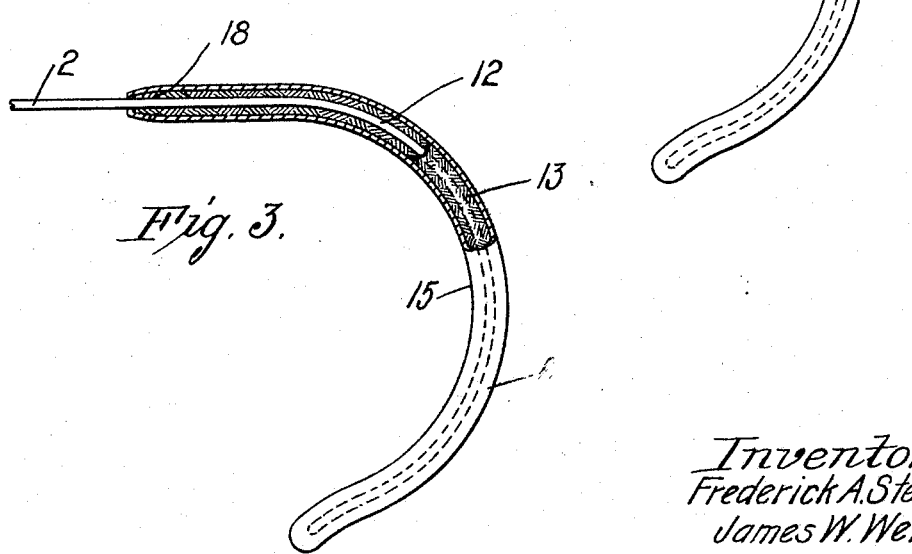

Fig. 1 of the accompanying drawings is an elevation of a spectacle temple constructed according to a preferred embodiment of the present invention; Fig. 2 is a fragmentary enlarged view of the same, partly in section; and Fig. 3 is a view of a modification.

Spectacle temples usually comprise a forward portion 2 at the forward end 4 of which the temple is adapted to be hinged to a lens-carrying frame (not shown), as by means of a hinge 5, and a rear portion 6 that is adapted to engage some part of the head of the wearer, as the skull or behind the ear. The forward portion may be of non-metallic material, as shown in Figs. 1 and 2, or of metal, as shown in Fig. 3. The rear portion 6 should be flexible.

According to the present invention, flexibility is attained by covering a flexible reinforcing rod 12 with a fabric 13. The fabric 13 is preferably in the form of a tube that is slipped over the rod 12, though the fabric may also be applied in any other desired manner. The fabric covering is then enclosed within a non-metallic tube 15. The temple is thus endowed with flexibility, but without destroying its non-metallic appearance. The tube 15 may be applied to the covering in any desired manner. The thinner that the tube 15 is, the more flexible will be the temple. It is therefore found, in practice, desirable to form a tube 15 by coating the fabric with one or a plurality of layers of liquid zylonite, and allowing the liquid zylonite to solidify. The fabric and the reinforcing rod therein may be bent to the desired shape of temple either before or after the zylonite or other non-metallic tube 15 is applied.

If the forward portion 2 of the temple is constituted of non-metallic material, such as is ordinarily employed in non-metallic spectacle temples, and as is illustrated in Figs 1 and 2, the rear end 14 of the non-metallic member may be provided with an opening 16 within which the forward end 18 of the fabric 13 is secured. This may be done in any desired manner, as by crimping, with heat and pressure, by cementing, and the like. The non-metallic member 2 may be bored at 20 to form a tube, and the rod 12 may be extended through the bore 20 of the tube, so as to reinforce not only the fabric, but the non-metallic member 2 as well. The non-metallic member 2 and the tube 15 will then, in effect, form an integral non-metallic tube with in which the rod 12 and the fabric covering 13 therefor are enclosed.

It will, of course, be understood that the modifications illustrated and described herein do not, by any means, exhaust the possibilities of this invention. Other modifications will readily occur to persons skilled in the art, and all such are considered to fall within the spirit of the invention, the scope of which is defined in the appended claims.

What is claimed is:

1. A spectacle temple comprising a rod, a fabric covering for the rod, and a non-metallic tube within which the fabric covering is enclosed.

2. A spectacle temple comprising a rod, and a fabric covering for the rod, the fabric covering being coated with zylonite.

3. A spectacle temple comprising a rod having a forward portion and a rear portion, a non-metallic tube enclosing the forward portion, a fabric covering for the rear portion, and a non-metallic tube within which the fabric covering is enclosed.

4. A spectacle temple comprising a reinforcing rod the forward portion of which is covered with a non-metallic tube and the rear portion of which is enclosed in a fabric covering.

5. A spectacle temple comprising a non-metallic tube the rear end of which is provided with an opening, a reinforcing rod the forward portion of which is mounted in the tube and the rear portion of which is bent to the shape of a temple, and a fabric covering for the rod and extending into the opening, the fabric covering being coated with zylonite.

6. A spectacle temple comprising a rod, a fabric covering for the rod, and a non-metallic tube within which the rod and the fabric covering therefor is enclosed.

7. A spectacle temple comprising a non-metallic element, and a fabric enclosed in the non-metallic element, the temple being adapted to be hinged at the forward end and its rear portion being bent to the shape of a temple.

8. A spectacle temple comprising a rod, a non-metallic covering for the rod, the temple being adapted to be hinged at the forward end and its rear portion being bent to the shape of a temple, and a flexible element interposed between the rod and the non-metallic covering at the rear portion of the temple.

In testimony whereof, we have hereunto subscribed our names this 6th day of June, 1923.

FREDERICK A. STEVENS.
JAMES W. WELSH.